Oct. 23, 1928.
A. A. WELMAN
1,688,568
COINCIDENTAL LOCK FOR AUTOMOBILES
Filed June 14, 1927
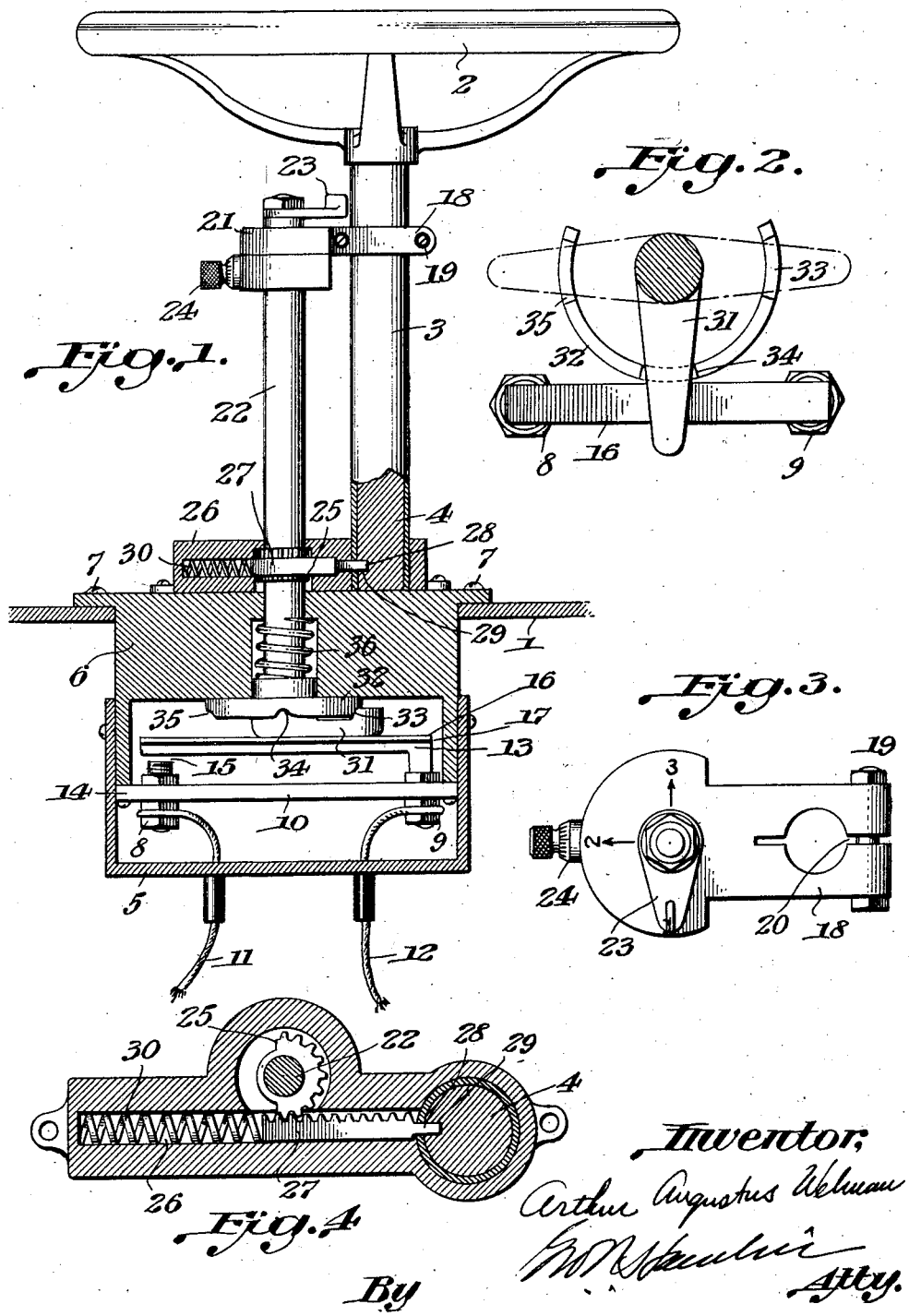

Patented Oct. 23, 1928.

1,688,568

UNITED STATES PATENT OFFICE.

ARTHUR AUGUSTUS WELMAN, OF EVANSVILLE, INDIANA.

COINCIDENTAL LOCK FOR AUTOMOBILES.

Application filed June 14, 1927. Serial No. 198,796.

Heretofore locks have been provided whereby the steering wheel shaft and the ignition for an automobile may be coincidentally locked, the purpose being to prevent closing the ignition switch and turning the steering wheel. These earlier devices have practical advantages in so far as protecting the automobile from theft is concerned but they have no advantage in respect to protection against fire due to fault in the ignition system.

The object of my invention is to provide means which will be adapted to break or disconnect the circuit between the battery and the starting switch of an automobile and, further, adapted to lock the steering wheel shaft.

The embodiment of the invention which is hereinafter described and is set forth in the appended claim, comprehends the fulfillment of both of these objects.

My lock may be used only to disrupt or break the circuit between the battery and the starter switch, or, it may be so operated that the steering wheel shaft will be locked additionally to breaking the circuit.

The invention, therefore, serves two purposes to wit: it is a safety means to prevent short circuiting and hence danger from fire and in that respect it materially differs from those earlier ignition switch locking devices which merely prevent the closing of the ignition switch for, it will be understood, that the locking of the ignition switch does not break the circuit leading from the battery to the starter switch and, therefore, does not serve as a fire prevention device.

In its other aspect the invention serves both as a fire preventing device and as a theft preventing device because, if the device is operated to not only break the circuit from the battery starter switch but also lock the shaft of the steering wheel, then the vehicle cannot be steered and hence theft of the automobile is prevented. In the drawings:

Figure 1, is a side elevation partly in section, the handle being in locked position;

Fig. 2, is a detail horizontal section taken immediately above the locking rack, dotted lines representing different positions of the switch actuating arm;

Fig. 3, is a detail plan view of the block which carries the operating handle; and Fig. 4, is a detail horizontal section through the casing for the locking means, showing the steering shaft locked.

The floor board of an automobile is shown at 1, the steering wheel appears at 2, the steering column is shown at 3, and the steering shaft is designated 4.

The switch which controls the circuit from the battery to the starter switch of the automobile is carried by a suitable shell or casing 5 which, in turn, is connected to a fitting 6 suitably secured at 7 to the floor board 1.

The switch comprises terminals 8, 9 which are connected to a piece of insulating material 10 and comprise nuts and screws for the attachment of the parts 11, 12 of the circuit wires leading from the battery starter switch. The starter switch for the engine is not shown.

The switch comprises a strip or tongue 13 suitably connected to terminal 9 and overlying the strip 10. The free end 14 of this switch tongue normally lies above the tip of the screw of the terminal 8 so that the circuit from the battery starter switch is normally broken by the gap 15.

Above the tongue 13 is a metal strip 16 between which and the switch tongue is a strip of insulating material 17. The strip 16 serves as a wear or pressure strip.

Clamped around the steering column 3 is a block 18 which may be securely fastened in position by a bolt 19, the block being split at 20 for that purpose. The block 18 carries a head 21 which is provided with suitable indicia such as numbers "1", "2", "3", indicating different positions to apprise the driver of the condition of the device at any given time and to guide him in selecting the position desired. For instance, the No. "1" indicates the full locked and safety condition, that is, that the steering shaft 4 is locked so that it cannot be turned by the wheel 2 and that the switch tongue 13 is separated from the terminal 8 at the gap 15. The position indicated by "2" represents the running position, that is, that the shaft 4 is unlocked and the circuit is closed at 15 by engagement of the tip 14 with the terminal 8 at the point 15.

The position indicated at "3" represents the safety position only, that is, that the switch tongue 13 is separated or out of contact with the terminal 8 but the shaft 4 is not locked.

For instance, there are many occasions when the driver simply wishes to leave his car in a garage, or elsewhere without locking it and yet desires to disconnect the battery from the starter switch so that all danger of fire is obviated. The position "3" is then selected. On the other hand, when the car is to be locked and also conditioned to prevent fire, the position 1 is selected.

When the position 2 is selected, the driver knows that the switch tongue 13 is closed and the circuit is complete to the starter switch.

To accomplish the foregoing functions, I provide means now to be described, comprising a controlling shaft 22 to which is secured an actuating and indicating handle 23 which, according to its position in connection with the indications "1", "2", "3", enables the driver to bring about effects previously described.

To lock the shaft 6 in the position to which it may be turned by the handle 23, I provide any suitable lock, conventionally indicated at 24. As shown, this lock is a combination lock but it may be a key-operated lock.

The shaft 22 is rotarily mounted in the part 21 of the block 18 and it is also rotarily mounted in the block 6. This shaft carries a mutilated pinion 25 which is housed within the casing 26 that surmounts the block 6 and is secured to it in any suitable manner. Slidably mounted in the casing 26 is a rack 27 which is in mesh with the pinion 25 and has a locking end 28 adapted to enter a hole 29 in the side of the shaft 4. Other means than these devices may be employed for locking the shaft 4. Normally, the coil spring 30 presses the rack 27 toward the shaft 4 but the position of the rack 27 and the locking end 28 is controlled by the position of the shaft 22 which, in turn, is controlled by the position of the handle 23.

For the purpose of depressing or releasing the switch tongue 13, there is provided an arm 31 which is suitably secured to the lower end of the shaft 22 and is adapted to cause the plate 16 to press down on the arm 13 or to release said arm. The arm 31 is held in its different positions corresponding to the positions "1", "2", "3", by an arc-shaped rack 32 which has notches 33, 34, 35. A coil spring 36 which surrounds the lower end of the shaft 22 and holds the arm 31 in the different positions to which it may be turned by the manipulation of the handle 23 is provided. When the handle 23 is turned to the "2" position, the turning of the arm 31 causes it to ride on the rack 32 and to depress the arm 13 so that it will make contact with the terminal 8 and remain in contact therewith, the lock 24 being used to lock the shaft 22 in that position. This is the running position. The turning of the shaft 22 retracts the rack 27 and unlocks the steering wheel shaft 4.

When the handle 23 is turned to the "1" position, the spring 30 is permitted to push the end 28 into the hole 29 to lock the shaft 4 and the arm 31 enters the notch 34 and releases the pressure on the arm 13 so that the circuit is broken at 15. In this condition, not only is the steering wheel shaft 4 locked but the circuit from the battery starting switch is broken.

When the handle 23 is turned to the "3" position, the rack 27 is withdrawn from its locking engagement with the shaft 4 but the arm 31 enters the notch 35 and frees the arm 13 so that the circuit is broken at 15.

What I claim is:

In a combined safety device and lock for automobiles, the combination with the steering shaft of the automobile, of a controlling shaft, means for turning said controlling shaft to different positions, a lock for locking the controlling shaft where set, a mutilated pinion carried by the controlling shaft, a spring-pressed locking rack engaged by said mutilated pinion which is adapted to lock the steering shaft or to be disengaged therefrom, and a circuit-controlling switch and an arm operated by said operating shaft and adapted to open or close the switch according to the setting of said shaft.

In testimony whereof I affix my signature.

ARTHUR AUGUSTUS WELMAN.